Dec. 3, 1929.                F. B. BUCKHOUT                1,738,350
                              WEATHER STRIP
                            Filed Oct. 31, 1928
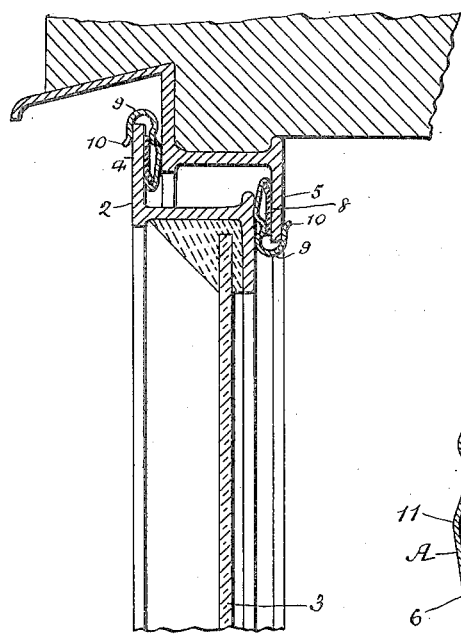
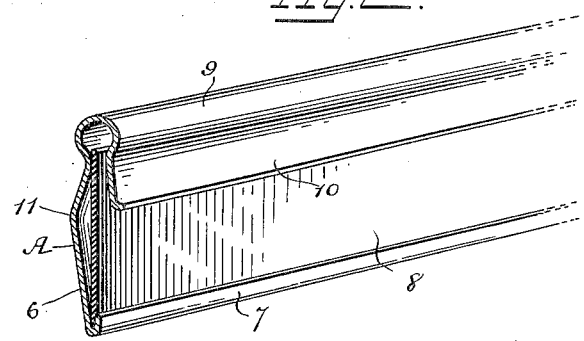
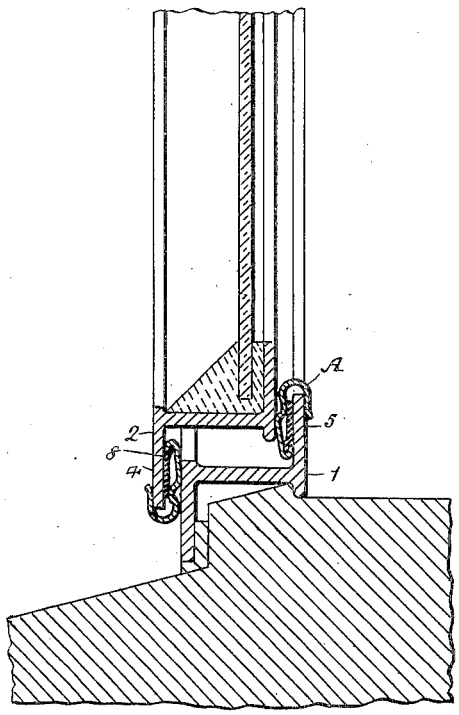
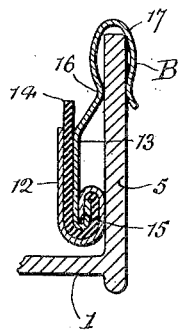
WITNESSES
INVENTOR
F. B. Buckhout
BY
ATTORNEY Patented Dec. 3, 1929

1,738,350

UNITED STATES PATENT OFFICE

FRANK B. BUCKHOUT, OF YONKERS, NEW YORK

WEATHER STRIP

Application filed October 31, 1928. Serial No. 316,226.

This invention relates to weather strips and more particularly to weather strips for metal sash of all types, including metal casement, pivot sash, etc.

An object of the invention is to provide a weather strip which may be slid or forced into position either on the window frame or on the casement window or on both, if desired, and which will be absolutely weathertight.

A further object is to provide a weather strip composed mainly of metal and having a rubber or other flexible portion, and which may be cut into proper lengths to fit any window or frame and be attached merely by pressing, forcing or sliding the weather strip onto its support.

A further object is to provide a strip which can be manufactured and sold at a reasonably low price and which will most efficiently perform the functions for which its is intended.

With these and other objects in view, the invention consists in certain novel features of construction and combinations and arrangements of parts, which will be more fully hereinafter described and pointed out in the claim.

In the accompanying drawings—

Figure 1 is a broken view in vertical section through a metal window frame and casement window, showing both the frame and the window equipped with my improved weather strips, although it is to be distinctly understood that this view is for illustration only as it is hardly possible that weather strips will be desired both on the frame and the window as the location of the weather strips on either the frame or the window will answer all purposes;

Figure 2 is a fragmentary, sectional, perspective view of my improved weather strip shown in Figure 1;

Figure 3 is a view in cross section showing a modified form of window strip in position on the window frame.

1 represents a window frame and 2 the frame of a casement window 3. These frames 1 and 2 may of course be of any shape desired, but I have shown in the drawings a standard shape in which both frames constitute double angles in cross section.

In this form of frame construction the casement window has a flange 4 which engages the outer face of the window frame 1, and the window frame 1 has a flange 5 adapted to be engaged by the casement window so that a double seat is provided when the window is closed.

In Figure 1 the parts are shown in exaggerated position in order to illustrate more in detail the construction and locations of my improved weather strips.

Each weather strip comprises a strip of metal 6 which is overturned at one edge, as shown at 7, clamping a strip of rubber or other suitable material 8 against the metal strip.

The metal strip is rolled or otherwise curved throughout its length adjacent one edge, as shown at 9, and has a somewhat flared, integral tongue 10 extending from this curved or bent portion 9 overlying the rubber strip 8.

The metal strip between its edges is preferably bowed or flared outwardly, as shown at 11, so that when the weather strip is compressed a certain resiliency or flexibility of the metal strip functions to clamp the rubber strip tightly in place.

The lip or flange portion 10 constitutes a spring or resilient member adapted to clamp over the flange to which it is to be secured.

As above stated in Figure 1, I show weather strips A located on the frame 1 as well as the frame 2 of the casement window 3, but, in practice, the weather strips will be located at one of these positions, and it is hardly probable it will ever be necessary to use weather strips in both positions although this is possible. The view, however, indicates that the weather strips may be located in either position, in accordance with the desire of the user.

The weather strips are cut in suitable lengths and are forced onto the flanges 4 and 5 by positioning the lips or tongue portions 10 over the edges of said flanges. By reason of this construction it will be noted that when the casement window is closed it will function to compress the weather strip to a certain degree and force the rubber or other strip 8 tightly against its bearing face so as to exclude the weather.

In Figure 3 I illustrate a modification of my improved weather strip 7 and employ two metal strips 12 and 13 and a rubber or other strip 14 to form my improved weather strip B. The rubber strip 14 is mainly although not entirely confined between the metal strips 12 and 13 and these metal strips 12 and 13 have turned over clamping flanges 15 to clamp the parts together.

The metal strip 13 is laterally offset, as shown at 16, and has a bent over clamping member 17 extending throughout the length of the strip to engage the flange of the frame or casement.

In both forms of my invention it will be noted that the metal strip which holds the rubber or other analogous material has a laterally offset portion extending throughout its length which is bendable or compressible and also has a clamping portion at one edge to secure the weather strip in place and I require no other means than the resiliency of the weather strip to hold it in place.

Various changes and alterations might be made in the general form of the parts described without departing from my invention and hence I do not limit myself to the precise details set forth but consider myself at liberty to make such changes and alterations as fairly fall within the spirit and scope of the appended claim.

I claim:

A weather strip, comprising a strip of metal having one edge portion thereof bent upon itself forming a clamp of approximately U-shape in cross section adapted to clamp a flange, the intermediate portion of the metal strip being laterally offset throughout its length, and a flat non-metallic strip clamped to the metal strip by an overturned edge of the metal strip and extending across the offset portion of the metal strip, and adapted to lie flat against the flange to which the clamp is engaged.

FRANK B. BUCKHOUT.